(No Model.) 2 Sheets—Sheet 1.

L. MOND.
PRODUCTION OF STEAM FOR USE IN GAS PRODUCERS.

No. 577,606. Patented Feb. 23, 1897.

(No Model.) 2 Sheets—Sheet 2.

L. MOND.
PRODUCTION OF STEAM FOR USE IN GAS PRODUCERS.

No. 577,606. Patented Feb. 23, 1897.

Witnesses
F. S. Elmore.
Arthur Ashley.

Inventor
Ludwig Mond
By P. Y. Dodge
Atty.

UNITED STATES PATENT OFFICE.

LUDWIG MOND, OF NORTHWICH, ENGLAND.

PRODUCTION OF STEAM FOR USE IN GAS-PRODUCERS.

SPECIFICATION forming part of Letters Patent No. 577,606, dated February 23, 1897.

Application filed October 5, 1895. Serial No. 564,718. (No model.)

*To all whom it may concern:*

Be it known that I, LUDWIG MOND, manufacturing chemist, a subject of the Queen of Great Britain, residing at Winnington Hall, Northwich, in the county of Chester, England, have invented certain new and useful Improvements in the Economical Production of Steam for Use in Gas-Producers, of which the following is a specification.

In my American patent, No. 547,276, I described a system of gas production and washing whereby I was able to obtain in the form of ammonia nearly all the nitrogen originally present in the fuel. This was done by supplying the air to the gas-producer in a heated state and so saturated with steam that the temperature of the producer was kept at a dull-red heat and therefore below the point of dissociation of ammonia. So great, however, was the amount of steam required (about eighty thousand cubic feet to the ton of coal) that to obtain the best results a large amount of extraneous steam had to be supplied at considerable expense. It is to get this additional steam or mixture of steam and air without much, if any, additional cost that this my present invention, which I will now describe, is designed. I utilize the gas by driving gas-motors with it, for which purpose it is particularly well adapted through its being washed clean of all tarry and mechanical impurities. The heat of the exhaust gases of the motors is in turn used to obtain the necessary additional steam for the gas-producers.

The invention is best described by aid of the accompanying diagrammatic drawings.

Figure 1:
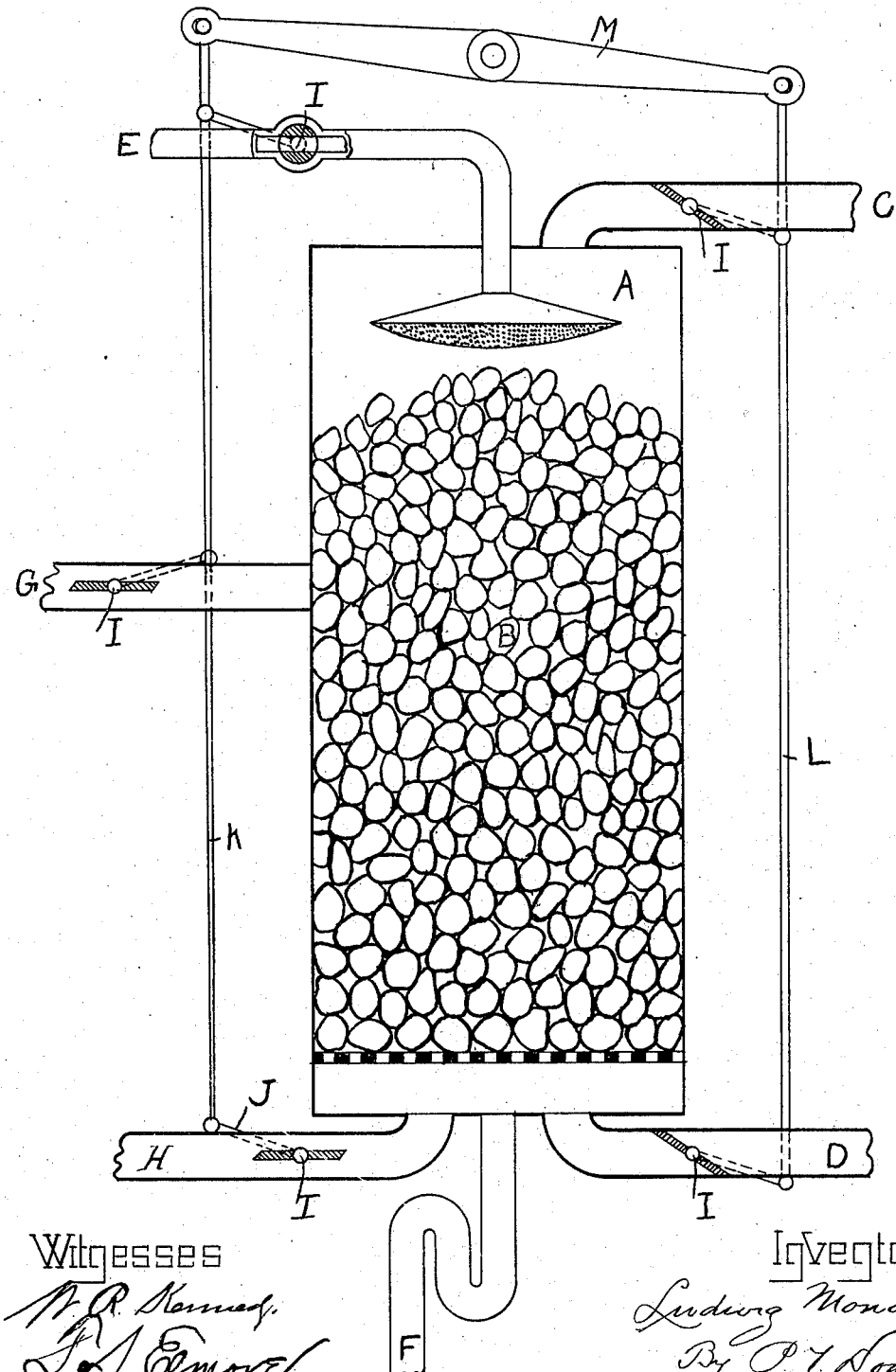
Figure 2:
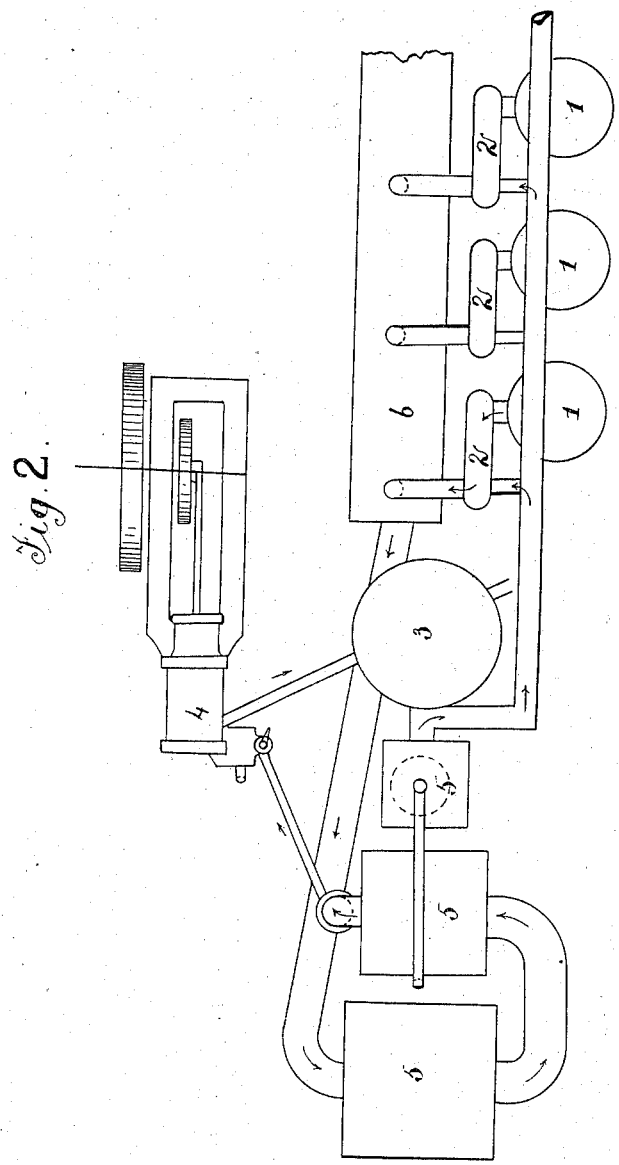

Figure 1 shows a cross-section of my apparatus for utilizing the heat of the gas-motor exhaust gases; Fig. 2, a diagrammatic plan view of my entire apparatus.

Referring first to Fig. 2, 1 is the gas-generator; 2, the superheater; 3, the regenerators, hereinafter described as chamber A and accessories; 4, gas-engines; 5, scrubbers, and 6 the washer. All of these except the regenerator and gas-engine are set forth in Patent No. 547,276 and are not herein claimed. The gas-engine can be of any well-known type.

Referring now to Fig. 1, two or more chambers A, preferably vertical cylinders, are loosely stacked with cast-iron bricks or balls or wrought-iron scrolls or other sufficiently-refractory articles capable of absorbing and again giving out a large amount of heat. Through each of these chambers alternately the exhaust-gases are passed in a downward direction, entering at C and going out at D. Alternately with the gases water is passed in a downward direction through the chambers, entering at E and leaving at F. The bricks or scrolls B, heated by the passage of the exhaust gases of the gas-motor, give up their heat to the water in turn and wholly or partially convert it into steam, which escapes at G.

In order to get the maximum production of steam from the arrangement, the air already saturated by steam to a certain extent according to my previous invention mentioned above is passed on its way to the producer into the chamber at H and passing through in an upward direction escapes at G. The water at the same time passing in a downward direction through the chamber is converted into steam at a temperature below 100°, and the air and steam escape together at G. The surplus water is cooled by the entering air nearly to the initial temperature of the latter before it escapes, thus utilizing to the utmost the heat stored up in the chamber. An excess of water can thus be used and the accumulation of salts and other incrustations in the chamber thereby avoided.

I I in the drawings show, diagrammatically, the valves or cocks; J, levers therefrom; K L, two rods actuating alternately all the valves on one side; M, an oscillating lever working both rods simultaneously and oscillated suddenly and at frequent intervals by gearing from the engine or shafting. Any kind of intermittent gear can be used, such gear forming no part of my invention.

The hot water obtained by cooling the cylinders of the generator is advantageously applied to be evaporated in the manner described.

The apparatus for changing the alternate currents can be run automatically from the shaft of the engine or other motor, and by using very frequent alternations the size of the chambers can be very greatly reduced.

I declare that what I claim is—

1. The process of producing steam in the manufacture of gas in gas-producers, which consists in gasifying fuel by partial combustion with a mixture of hot air and steam, separating the ammonia, using the heat of the partial combustion to heat the said mixture of air and steam, utilizing the gas by explosion or combustion for motive power and passing the hot exhaust-gases alternately with water and the aforesaid mixture of hot air and steam through a regenerator; whereby the mixture is sufficiently heated and loaded with moisture to serve the purpose of gasifying the fuel in gas-producers under the most favorable conditions for obtaining ammonia as a by-product.

2. The process of utilizing the heat of refuse gases, which consists in passing the said gases and water alternately in the same direction past a large surface of refractory material and passing moist air in the reverse direction while the water is passing.

3. The improvement in the process of utilizing the heat in the hot exhaust-gases of a gas-engine, which consists in passing the said gases and water alternately over an extended surface of refractory material, passing air more or less saturated with moisture over that surface at the same time as the water but in a contrary direction, and leading off the mixed steam and air for use in gas-production.

4. A chamber loosely stacked with refractory materials in combination with the exhaust-pipe from a gas-motor entering above, exit-pipe for said gases escaping below, a water-supply entering also above, an escape-pipe for surplus water below, and escape for steam near the top, and a valve mechanism, whereby the water and the exhaust-gases are (alternately with each other) passed through the chamber and cut-off and the steam-escape is opened during the passage of the water and cut off therewith.

5. A chamber loosely stacked with refractory material, provided with an entrance at the top and exit below for hot gases, an entrance above and an exit below for the passage of water, an entrance below and an exit near the top for the passage of air or a mixture of air and steam and means for alternating the passage of the hot gases with the simultaneous passage of the air and water aforesaid, substantially as and for the purposes described.

In testimony whereof I have signed my name to this specification in the presence of two subscribing witnesses.

LUDWIG MOND.

Witnesses:
G. F. WARREN,
JOSEPH LAKE.